(12) United States Patent
Han

(10) Patent No.: US 6,406,736 B1
(45) Date of Patent: Jun. 18, 2002

(54) PROCESS FOR MAKING CREAM CHEESE PRODUCTS WITHOUT WHEY SEPARATION

(75) Inventor: Xiao-Qing Han, Naperville, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 09/804,090

(22) Filed: Mar. 12, 2001

(51) Int. Cl.$^7$ .............................................. A23C 19/00
(52) U.S. Cl. ...................... 426/582; 426/580; 426/519
(58) Field of Search ............................... 426/580, 582, 426/583, 519

(56) References Cited

U.S. PATENT DOCUMENTS

| | | |
|---|---|---|
| 5,079,024 A | 1/1992 | Crane |
| 5,180,604 A | 1/1993 | Crane et al. |
| 5,252,352 A | 10/1993 | Banach et al. |
| 5,356,639 A | 10/1994 | Jameson et al. |
| 5,378,478 A | 1/1995 | Miller et al. |
| 5,395,631 A | 3/1995 | Sweeney |
| 5,520,948 A | 5/1996 | Kvamme |
| 5,676,984 A | 10/1997 | Bohanan et al. |
| 5,679,396 A | 10/1997 | Finnocchiaro |
| 6,096,352 A * | 8/2000 | Kijowski et al. .............. 426/36 |

* cited by examiner

*Primary Examiner*—Leslie Wong
(74) *Attorney, Agent, or Firm*—Fitch, Even, Tabin & Flannery

(57) ABSTRACT

This invention is directed to a cream cheese product prepared in a process which does not involve whey separation and does not require fermentation. The wheyless process of the invention permits the production of cream cheese products containing more than about 65 percent moisture with a high whey protein/casein ratio (e.g., about 60/40 or higher) and with desirable firmness even without the addition of gum.

16 Claims, 1 Drawing Sheet

PROCESS FOR MAKING CREAM CHEESE PRODUCTS WITHOUT WHEY SEPARATION

FIELD OF THE INVENTION

This invention is directed to a process for making a cream cheese product which does not include a whey separation step and does not require fermentation. The invention also is directed to the cream cheese product made by the process of the invention.

BACKGROUND OF THE INVENTION

Whey produced from cheese making (including cream cheese) limits productivity because it produces whey as a by-product. Whey has few uses and results in the loss of valuable protein for the cheese product. The production of whey can also create additional costs for waste treatment, even though whey contains food grade ingredients which have been separated from milk. The inability of whey proteins to be retained in cheese is an important factor contributing to a lack of efficiency in the production of cheese, including reductions in overall yield and increased costs. Although whey has sometimes been further processed to obtain food ingredients, the acid whey generated cream cheese product cannot normally be utilized in this manner. Further, traditional cheese making contemplates culturing and fermentation which takes time and space in the form of culturing tanks.

It would be desirable, therefore, to provide a process for making cream cheese in which whey is retained in the final product and which does not involve a fermentation step. The present invention provides such a process.

SUMMARY OF THE INVENTION

The invention produces cream cheese products without the separation of whey and without fermentation. The invention produces cream cheese products without curding or acidifying milk. The wheyless process of the invention permits the production of cream cheese products containing more than about 65 percent moisture with a high ratio of whey protein/casein (e.g., about 60/40 or higher) and with desirable firmness even without the addition of gum. The advantages of the invention include: (1) significant cream cheese yield increase; (2) no cost for the treatment of whey which is not produced in the invention; (3) more options for using raw materials; (4) no requirement for milk culturing tanks that will save capital cost and plant space; (5) a simplified process which permits a continuous operation with shorter processing periods; and (6) minimized syneresis of final products. Additionally, the invention provides cream cheese products with a greater nutritional quality because of a higher percentage of more readily available whey protein and potentially fewer calories from fat (i.e., low fat products).

Moreover, the invention does not produce processing waste from raw materials because the cheese product of the invention will retain almost all other soluble nutrients (especially those important soluble components in human milk).

The cream cheese products produced by the method of this invention generally have high moisture levels (e.g., greater than about 65 percent) and high ratios of whey protein to casein (e.g., about 60/40 or higher). More preferably, the moisture level is about 55 to about 70 percent and the whey protein/casein ratio is about 30/70 to about 90/10.

The present invention provides a process for making a wheyless cream cheese product, said process comprising: (1) mixing water and a dairy protein selected from the group consisting of whole milk protein, milk protein concentrate, whey protein concentrate and mixtures thereof to provide an aqueous dairy protein blend having at least about 4 percent protein; (2) homogenizing the aqueous dairy protein blend in a first homogenization step to provide an aqueous dairy protein emulsion; (3) heating the aqueous dairy protein emulsion to a temperature of at least about 150° F. for at least about 5 minutes to provide a heated homogenized dairy emulsion; (4) adjusting the pH of the heated homogenized dairy emulsion to about 4 to about 6; and (5) homogenizing the pH-adjusted heated homogenized dairy emulsion in a second homogenization step at a pressure of at least about 2000 psi to provide the wheyless cream cheese product; wherein the process does not include a whey separation step or a fermentation step.

The present invention also provides a process for making a wheyless cream cheese product, said process comprising: (1) mixing water and a dairy protein selected from the group consisting of whole milk protein, milk protein concentrate, whey protein concentrate, and mixtures thereof to provide an aqueous dairy protein blend having at least about 4 percent protein; (2) homogenizing the aqueous dairy protein blend in a first homogenization step to provide an aqueous dairy protein emulsion; (3) heating the aqueous dairy protein emulsion to a temperature of at least about 150° F. for at least about 5 minutes to provide a heated homogenized dairy emulsion; (4) adjusting the pH of the heated homogenized dairy emulsion to about 4 to about 6 either during or after step 3; (5) adding an additional material to either the aqueous dairy protein emulsion prior to step 3 and then completing steps 3 and 4 or adding the additional material to the heated aqueous protein blend from step 3 and then completing step 4 or adding the additional material to the pH-adjusted homogenized dairy emulsion from step 4 to provide an enhanced protein dairy blend, wherein the additional material is selected from the group consisting of milk protein, whey protein, edible fat, and mixtures thereof; (6) adding a stabilizer to the enhanced protein dairy blend; and (7) homogenizing the stabilizer-containing enhanced protein dairy blend in a second homogenization step at a pressure of at least about 2000 psi to provide the wheyless cream cheese product; wherein the process does not include a whey separation step or a fermentation step.

This invention also provides a wheyless cream cheese product prepared by a process comprising: (1) mixing water and a dairy protein selected from the group consisting of whole milk protein, milk protein concentrate, whey protein concentrate, and mixtures thereof to provide an aqueous dairy protein blend having at least about 4 percent protein; (2) homogenizing the aqueous dairy protein blend in a first homogenization step to provide an aqueous dairy protein emulsion; (3) heating the aqueous dairy protein emulsion to a temperature of at least about 150° F. for at least about 5 minutes to provide a heated homogenized dairy emulsion; (4) adjusting the pH of the heated homogenized dairy emulsion to about 4 to about 6 either during or after step 3; (5) adding an additional material to either the aqueous dairy protein emulsion prior to step 3 and then completing steps 3 and 4 or adding the additional material to the heated aqueous protein blend from step 3 and then completing step 4 or adding the additional material to the pH-adjusted homogenized dairy emulsion from step 4 to provide an enhanced protein dairy blend, wherein the additional material is selected from the group consisting of milk protein, whey protein, edible fat, and mixtures thereof; (6) adding a stabilizer to the enhanced protein dairy blend; and (7) homogenizing the stabilizer-containing enhanced protein dairy blend in a second homogenization step at a pressure of at least about 2000 psi to provide the wheyless cream cheese product; wherein the process does not include a whey separation step or a fermentation step.

DETAILED DESCRIPTION OF THE INVENTION

Figure 1:
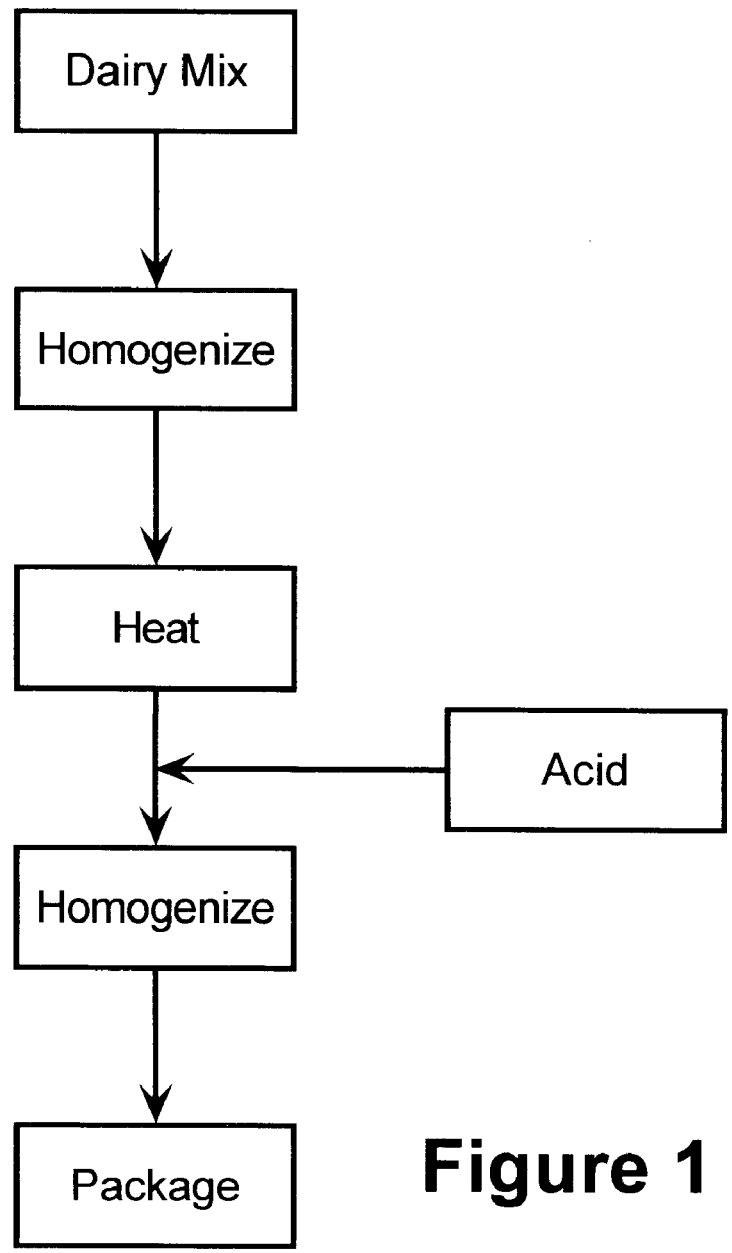
FIG. 1 provides a flowchart illustrating the general process of the invention.

The process of the invention includes mixing water and milk protein, such as whole milk protein, milk protein concentrate, whey protein concentrate, cultured milk, and mixtures thereof to provide an aqueous protein blend (i.e., a dairy mix) having at least about 4 percent protein. Inclusion of cultured milk in the dairy mix generally provides a cream cheese with better flavor. Thereafter, the aqueous protein blend or dairy mix is homogenized to provide a homogenized aqueous protein emulsion. In an important aspect, this first homogenization provides an emulsion with an average particle size of less than about 3 microns, preferably about 0.3 to about 2 microns. In an important aspect, the homogenization is carried out using a pressure at least at 2000 psi. Preferably, this first homogenization is implemented with a two-stage homogenizer having a first stage at a pressure of about 2000 to about 8000 psi and a second stage at a pressure of about 300 to about 1000 psi. The homogenized aqueous protein emulsion is heated to at least about 150° F. and held for at least about 5 minutes to provide a heated homogenized emulsion. Preferably, the heated homogenized emulsion is heated to about 150° F. to about 200° F. and held for about 5 to about 80 minutes. More preferably, the product is heated to about 170° F. to about 195° F. for about 5 to about 50 minutes in order to provide a heat denatured protein matrix stabilized emulsion system.

The pH of the heated homogenized emulsion is adjusted with a food grade acid to provide the emulsion with a pH in the range of from about 4 to about 6, and preferably in the range of about 4.5 to about 5.5. Adjustment of the pH to this value helps to obtained the desired firm texture and microbiological stability; it also helps achieve the desired product flavor/taste characteristics. If desired, the pH adjusted emulsion may be stabilized with an stabilizer, including, for example, gums, salts, emulsifiers, and mixtures thereof, to provide a stabilized emulsion. Suitable gums include, for example, xathan gum, locus bean gum, guar gum, carrageenan, and the like, as well as mixtures thereof. Suitable salts include, for example, sodium chloride, other edible salts, and the like, as well as mixtures thereof. Suitable emulsifiers include, for example, sodium citrate, potassium citrate, monosodium phosphate, disodium phosphate, trisodium phosphate, sodium aluminum phosphate, sodium tripolyphosphate, sodium hexametaphosphate, dipotassium phosphate, sodium acid pryrophosphate, and the like, as well as mixtures thereof. The moisture content of the stabilized emulsion is controlled by the amount of water added to the formulation; if necessary, it can be further adjusted by evaporation or the addition of more water. Generally, the desired moisture content in is the range from about 60 to about 70 percent.

During or after heating, the heated homogenized emulsion is homogenized in a second homogenization step at a pressure of at least about 2000 psi to provide wheyless cream cheese product. Preferably, this second homogenization is a two-stage homogenization with the first stage being at about 2,500 psi to about 7,000 psi and the second stage being at about 300 psi to about 1000 psi, preferably at about 500 psi to about 800 psi. This second homogenization provides an emulsion with a particle size of from about 0.3 to about 2 microns, and preferably about 0.3 to about 1 microns.

Thereafter, the wheyless cream cheese product is packaged using conventional techniques, including, for example, cold or hot packing techniques. Preferably the wheyless cream cheese product is hot filled into suitable containers (e.g., tubs) at a temperature of least about 130° F. and refrigerated at about 35 to 45° F.

The initial aqueous protein blend or dairy mix can be, and preferably is, pasteurized at about 150° F. to about 180° F. for about 2 to about 60 minutes prior to the first homogenization step. If desired, additional ingredients such as milk protein, cultured milk, whey protein, edible fat, and mixtures thereof can be mixed with the initial aqueous protein blend to provide an enhanced protein blend. Suitable edible fats include, for example, butter, cream, anhydrous milkfat, vegetable fats, and mixtures thereof as well as the like. In this aspect, the additional ingredients may be added as an emulsion. Such an enhanced protein blend or enhanced dairy mix can be treated in the same manner as described above for the non-enhanced dairy mix.

As used herein, "casein" relates to any, or all, of the phosphoproteins in milk, and to mixtures of any of them. An important characteristic of casein is that it forms micelles in naturally occurring milk and in the dairy liquids employed in the present invention. Many casein components have been identified, including, but not limited to, α-casein (including $\alpha_{s1}$-casein and $\alpha_{s2}$-casein), β-casein, k-casein, and their genetic variants.

As used herein, "whey protein" relates to the proteins contained in the dairy liquid (i.e., whey) obtained as a supernatant of the curds when milk or a dairy liquid containing milk components are curded to produce a cheese-making curd as a semisolid. Whey protein is generally understood to include principally the globular proteins β-lactoglobulin and α-lactalbumin. It may also include significantly lower concentrations of immunoglobulin and other globulins/albumins. As used herein, "whey protein concentrate" relates to a whey protein composition in which some, and preferably a significant amount (i.e., greater than about 80 percent), of the water has been removed.

As used herein "stabilizer" relates to a food-grade ingredient used to stabilize emulsions of fat and water, and include hydrocolloids (such as alginates, cellulose, cellulose derivatives, and the like), gums (such as xanthan gum, locus bean gum, guar gum, and the like), and surface active agents (such as lecithin, glycerol monostearate, polyoxyethylene stearate, and the like). In a preferred embodiment of the invention, gums such as xanthan gum, locus bean gum, and guar gum are used.

A "wheyless process" is intended to mean a cheese-making process in which whey is either not produced, or if whey is produced, such whey is not separated or removed and, therefor, the whey remains in the resulting cheese product.

The following examples are provided to illustrate the invention and not to limit it. Unless otherwise indicated, all percentages and ratios are by weight.

EXAMPLE 1

About 0.56 kg of whey protein (whey protein concentrate, AMPC 800), 0.23 kg of milk protein concentrate (NZ MPC 70), and 2.1 kg of hot water (about 150° F.), are mixed and sheared with 2.8 kg of melted anhydrous butter fat to form an emulsion system. Whole milk (8.2 kg) of whole milk was heated to about 160° F. in a cooker and held for 20 minutes; sufficient hot water was added to compensate for water evaporation. The heated milk was mixed with emulsion system and then homogenized the at 2500/500 psi. The resulting homogenized sample was heated to about 170° F. and held for about 30 minutes during which time 70 g lactic acid (88%) was added to adjust the pH to about 5.1. Hot water was added to adjust the moisture content to 68 percent. The resulting mixture was homogenized at 3000/500 psi pressure to provide a homogenized wheyless cream cheese product. The wheyless cream cheese product was hot filled at about 150° F. into cups and sealed. The hot filled samples were stored at about 40° F.

A control sample was prepared to test the affect of acidifying process (i.e., mimic the process of milk culturing) on product texture. The control sample was prepared as above except that lactic acid was added to the whole milk before heating and the moisture content was not adjusted to compensate for water evaporation.

No salts/gum were added to either inventive or control samples. According to the experimental design, the product should contain about 6.0 percent protein, about 22 percent fat, and about 68 percent moisture and have a whey protein/casein ratio of about 60/40. The results are summarized in Table 1. The viscosity of the inventive sample is much higher than that of the control, although the former contains more moisture (67.4 percent vs 62.8 percent). This increase viscosity, relative to the control (i.e., acid added before forming the emulsion), is possible because a uniform emulsion system is prepared before acidification. This suggests that the whole milk system forms a better emulsion system with added emulsion mixture. The process of acidification or curding forms clotted protein aggregate that somehow may affect the formation of good emulsifying system.

TABLE 1

Comparison of wheyless cream cheese products produced from fresh milk and from acidified milk.

| | Inventive Sample Milk & Emulsion | Control Sample Acidified Milk & Emulsion |
|---|---|---|
| pH | 5.22 | 5.43 |
| Moisture (%) * | 67.44 | 62.78 |
| Cold Viscosity (Pa) | 3775 | 2420 |
| Syneresis @ 75° F. for 18 hrs (%) | 5.78 | 4.82 |

* Sample moisture was determined in a microwave oven at 80% power level.

The rate of syneresis of both samples is similar with the prototypes produced by traditional process (with whey separation) containing gum and salts. Considering the fact that both of the samples contained no gum or added salts, syneresis of the product produced by the developed technology was significantly minimized. By adding gum and salts, the rate of syneresis can be reduced to almost zero. For example, by adding about 0.1 to about 0.3 percent each of xanthan gum and salt, syneresis was reduced to almost 0 percent. The example illustrates that the invention produces wheyless cream cheese product (containing minimized protein with high ratio of whey protein to casein, much less fat, and much higher moisture) with desirable texture and minimal syneresis. If desired, the flavor can be adjusted by the addition of suitable flavorants.

EXAMPLE 2

This example considers the effect of the whey protein to casein ratio on product texture. Whole milk (12.7 kg) was heated to about 160° F. in a cooker and held for 20 minutes. The whey protein to casein ratio was adjusted to the desired level by addition of whey protein (whey protein concentrate, AMPC 800), milk protein concentrate (NZ MPC 70), melted anhydrous butter fat, and hot water (about 150° F.). Samples 1, 2, and 3 were prepared having whey protein to casein ratios of 70/30, 60/40, and 50/50, respectively.

The samples were homogenized at 3000/500 psi and then heated to elevated temperatures for 30 minutes; samples 1, 2, and 3 were heated to about 160, about 170, and about 180° F., respectively. During the heating process, 100 g lactic acid (88%) was added to each sample to adjust the pH to about 5. Hot water was added to adjust the moisture level to about 68 percent. The resulting samples were then homogenized at 4000/500 psi pressure. The resulting wheyless cream cheese products were hot filled at about 150° F. into cups and sealed. The hot filled samples were stored at 40° F.

No salts/gum were added to samples 1, 2, and 3. Sample 2G was prepared by mixing about 0.2 percent carob gum with a portion of sample 2 before the last homogenization step; no salts were added. Samples containing different whey protein were heated at different temperature after the first homogenization (as indicated above). All other processing conditions are the same.

The results from the cream cheeses produced are summarized in Table 2.

TABLE 2

| | Sample 1 | Sample 2 | Sample 3 | Sample 2G |
|---|---|---|---|---|
| Whey Protein to Casein Ratio | 70/30 | 60/40 | 50/50 | 60/40 |
| Moisture (%)* | 68.6 | 68.5 | 69.7 | 68.5 |
| pH | 5.13 | 4.98 | 5.25 | 5.00 |
| Cold viscosity (Pa) | 1821 | 2855 | 2756 | 2247 |
| Syneresis (%) at 3 hr, 75° F. | 6.1 | 3.8 | 4.8 | 0 |

*Moisture of the samples is determined by microwave oven test at 80% power level. Data are mean values of duplicated measurements.

Overall, excellent cream cheese products were obtained in all cases. In additional to their high viscosity, all samples were very smooth. Sample 2G, with added carob gum, had an overall better texture than the other samples prepared with gum. Although the sample with highest whey protein/casein ratio (i.e., sample 1 with a ratio of 70/30) was less firm, it still had a viscosity approaching 2000 Pa. An additional heat treatment (i.e., a temperature of about 194° F. for about 30 minutes) with a portion of sample 1 increased its cold viscosity up to about 4000 Pa. By modifying the processing conditions in this manner, higher viscosities from those reported in Table 2 are expected.

The syneresis of all samples were very low, indicating a well established stable system from the process. Even without the addition of gum, the rate of syneresis was within the range of about 4 to about 6 percent during a three-hour incubation at room temperature. For sample 2G, with added gum, the rate of syneresis was reduced to approximately 0, indicating an excellent textural stability.

Conventional cream cheese generally has much lower moisture content. At a moisture level of about 55 percent (i.e., the maximum allowed for cream cheese under current Standards of Identity), conventional cream cheese generally has a syneresis rate less than about 1 percent. However, when the moisture is increased in such conventional products, the rate of syneresis is increased significantly. Conventional cream cheese processes cannot produce products similar compositionally to the products produced herein and having desirable textural characteristics. The inventive process allows the production of cream cheese with increased moisture content, decreased protein content, and casein/whey ratio with desirable textural characteristics.

What is claimed is:

1. A process for making a wheyless cream cheese product, the process comprising:
   (1) mixing water and a dairy protein selected from the group consisting of whole milk protein, milk protein concentrate, whey protein concentrate and mixtures thereof to provide an aqueous dairy protein blend having at least about 4 percent protein;
   (2) homogenizing the aqueous dairy protein blend in a first homogenization step to provide an aqueous dairy protein emulsion;
   (3) heating the aqueous dairy protein emulsion to a temperature of at least about 150° F. for at least about 5 minutes to provide a heated homogenized dairy emulsion;
   (4) adjusting the pH of the heated homogenized dairy emulsion to about 4 to about 6; and
   (5) homogenizing the pH-adjusted heated homogenized dairy emulsion in a second homogenization step at a pressure of at least about 2000 psi to provide the wheyless cream cheese product;
   wherein the process does not include a whey separation step or a fermentation step.

2. A process according to claim 1, wherein the first homogenization is carried out at a pressure of at least about 2000 psi.

3. A process according to claim 2, wherein the second homogenization is a two-stage homogenization with a first stage operated at a pressure of at least 2,500 psi and a second stage operated at a pressure of at least 300 psi.

4. A process as recited in claim 3, wherein the aqueous dairy protein emulsion is heated at about 150 to about 200° F. for about 5 to about 80 minutes.

5. A process as recited in claim 1, wherein the wheyless cream cheese product is hot filled at a temperature of about 130° F. or higher.

6. A process as recited in claim 2, wherein the wheyless cream cheese product is hot filled at a temperature of about 130° F. or higher.

7. A process as recited in claim 3, wherein the wheyless cream cheese product is hot filled at a temperature of about 130° F. or higher.

8. A process as recited in claim 4, wherein the wheyless cream cheese product is hot filled at a temperature of about 130° F. or higher.

9. A process for making a wheyless cream cheese product, the process comprising:
   (1) mixing water and a dairy protein selected from the group consisting of whole milk protein, milk protein concentrate, whey protein concentrate, and mixtures thereof to provide an aqueous dairy protein blend having at least about 4 percent protein;
   (2) homogenizing the aqueous dairy protein blend in a first homogenization step to provide an aqueous dairy protein emulsion;
   (3) heating the aqueous dairy protein emulsion to a temperature of at least about 150° F. for at least about 5 minutes to provide a heated homogenized dairy emulsion;
   (4) adjusting the pH of the heated homogenized dairy emulsion to about 4 to about 6 either during or after step 3;
   (5) adding an additional material to either the aqueous dairy protein emulsion prior to step 3 and then completing steps 3 and 4 or adding the additional material to the heated aqueous protein blend from step 3 and then completing step 4 or adding the additional material to the pH-adjusted homogenized dairy emulsion from step 4 to provide an enhanced protein dairy blend, wherein the additional material is selected from the group consisting of milk protein, whey protein, edible fat, and mixtures thereof;
   (6) adding a stabilizer to the enhanced protein dairy blend; and
   (7) homogenizing the stabilizer-containing enhanced protein dairy blend in a second homogenization step at a pressure of at least about 2000 psi to provide the wheyless cream cheese product;
   wherein the process does not include a whey separation step or a fermentation step.

10. A process according to claim 9, wherein the first homogenization is carried out at a pressure of at least about 2000 psi.

11. A process according to claim 10, wherein the second homogenization is a two-stage homogenization with a first stage operated at a pressure of at least 2,500 psi and a second stage operated at a pressure of at least 300 psi.

12. A process as recited in claim 11, wherein the aqueous dairy protein emulsion is heated at about 150 to about 200° F. for about 5 to about 80 minutes.

13. A process as recited in claim 9, wherein the wheyless cream cheese product is hot filled at a temperature of about 130° F. or higher.

14. A process as recited in claim 10, wherein the wheyless cream cheese product is hot filled at a temperature of about 130° F. or higher.

15. A process as recited in claim 11, wherein the wheyless cream cheese product is hot filled at a temperature of about 130° F. or higher.

16. A process as recited in claim 12, wherein the wheyless cream cheese product is hot filled at a temperature of about 130° F. or higher.

* * * * *